US012785009B2

(12) United States Patent
Aurongzeb et al.

(10) Patent No.: US 12,785,009 B2
(45) Date of Patent: Nov. 3, 2026

(54) SUSTAINABLE SYSTEM AND METHOD OF ASSEMBLING REPAIRABLE KEYBOARD STRUCTURE WITH STACKING USER-REPLACEABLE COMPONENTS

(71) Applicant: Dell Products, LP, Round Rock, TX (US)

(72) Inventors: Deeder M. Aurongzeb, Austin, TX (US); Weijong Sheu, Austin, TX (US); Peng Lip Goh, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 545 days.

(21) Appl. No.: 18/384,046

(22) Filed: Oct. 26, 2023

(65) Prior Publication Data

US 2025/0140491 A1 May 1, 2025

(51) Int. Cl.

*G06F 1/16* (2006.01)
*G06F 3/02* (2006.01)
*H01H 13/702* (2006.01)
*H05K 5/00* (2025.01)
*H05K 7/00* (2006.01)

(52) U.S. Cl.

CPC ......... *H01H 13/702* (2013.01); *G06F 3/0202* (2013.01)

(58) Field of Classification Search

CPC .... H01H 13/702; H01H 13/70; G06F 3/0202; G06F 3/02; G06F 3/0219; G06F 3/0227; G06F 1/1669; G06F 1/1662; G06F 21/83

See application file for complete search history.

(56) References Cited

U.S. PATENT DOCUMENTS 6,965,076 B2 11/2005 Wu
10,860,112 B1 * 12/2020 Knoppert ................ G06F 3/044
11,366,523 B2 * 6/2022 Ligtenberg .............. G06F 3/016
2004/0070931 A1 4/2004 Wu
2006/0165465 A1 7/2006 Wu (Continued)

FOREIGN PATENT DOCUMENTS

EP 0657908 B1 5/2001
WO 2013/114110 A2 8/2013

*Primary Examiner* — Anthony M Haughton

(74) *Attorney, Agent, or Firm* — Prol Intellectual Property Law, PLLC; H. Kenneth Prol

(57) ABSTRACT

A sustainable and user-repairable keyboard structure for an information handling system may comprise a plurality of keyboard component layers for detecting and registering a user's downward force on keys as a keystroke, each of the keyboard component layers housing a guide magnetic gasket for aligning and magnetically coupling to another of the keyboard component layers, each of the keyboard component layers being separable from one another by a user exerting force to overcome a magnetic coupling between the guide magnetic gaskets, the keyboard component layers including a keyboard bottom case housing a replaceable battery disposed beneath a replaceable electrical key press detection membrane, the replaceable electrical key press detection membrane disposed beneath a replaceable rubber dome layer, and the rubber dome layer disposed beneath a keyboard top case housing the replaceable keys, and the keyboard bottom case fixed to the keyboard top case via mechanical fasteners.

20 Claims, 10 Drawing Sheets

(56) References Cited

U.S. PATENT DOCUMENTS

| | | | | |
|---|---|---|---|---|
| 2007/0199804 | A1* | 8/2007 | Joseph | H01H 13/705 200/5 A |
| 2009/0309836 | A1 | 12/2009 | Hsu | |
| 2014/0211395 | A1* | 7/2014 | Lin | G06F 1/1669 361/679.17 |
| 2017/0123509 | A1* | 5/2017 | Erman | G06F 3/04842 |
| 2017/0301488 | A1 | 10/2017 | Zhang | |
| 2020/0401265 | A1 | 12/2020 | Jain | |
| 2024/0282536 | A1* | 8/2024 | Stinebaugh | H01H 13/04 |

* cited by examiner

TOP PERSPECTIVE VIEW

CROSS-SECTIONAL SIDE VIEW

CROSS-SECTIONAL SIDE VIEW

CROSS-SECTIONAL SIDE VIEW

SUSTAINABLE SYSTEM AND METHOD OF ASSEMBLING REPAIRABLE KEYBOARD STRUCTURE WITH STACKING USER-REPLACEABLE COMPONENTS

FIELD OF THE DISCLOSURE

The present disclosure generally relates to assembly of a keyboard structure for an information handling system. More specifically, the present disclosure relates to the sustainable assembly and repair of a user-repairable keyboard structure with stacking user-replaceable components for decreasing waste caused by disposal of an entire keyboard assembly due to failure or breakage of single components housed therein.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more connectors for peripheral input/output devices that may also include a keyboard, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
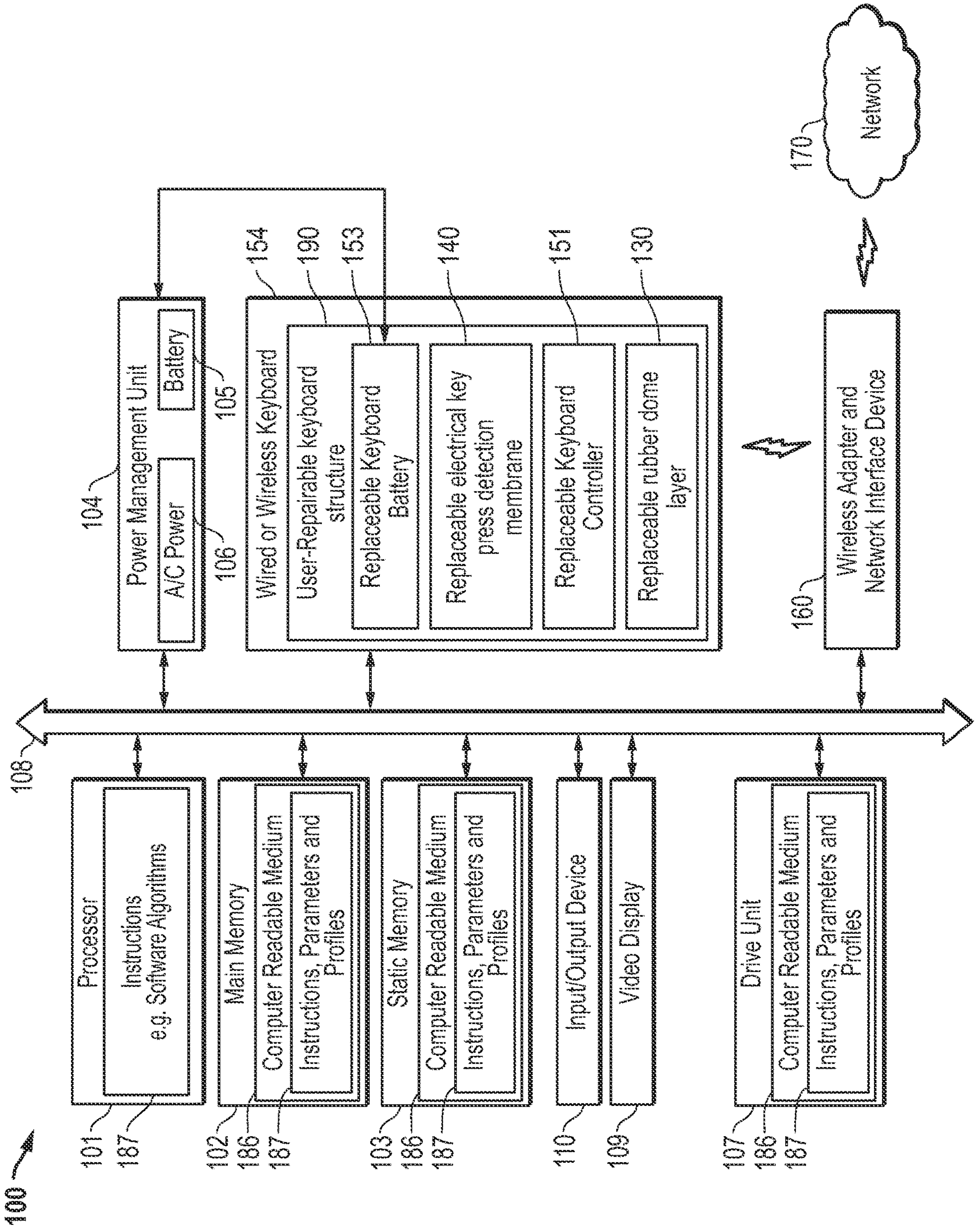
FIG. 1 is a block diagram illustrating an information handling system operatively coupled to a user-repairable keyboard assembly according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Keyboard assemblies for information handling systems undergo wear and tear throughout their life cycles that may result in failure or breakage of individual components of the keyboard, such as individual keys, the rubber dome layer disposed directly beneath these keys for detection of keystrokes, the electrical keystroke detection membrane disposed beneath the rubber dome layer for detecting and communicating detected keystrokes to a keyboard controller, the keyboard controller itself, or a battery for the keyboard. For example, dropping the keyboard or dropping a heavy object on the keyboard may cause breakage of individual plastic keys, or may jar the battery or keyboard controller loose and disconnect them from other components. As another example, spilling liquids on the surface of the keyboard may irreparably damage the rubber dome layer, the electrical keystroke detection membrane, the keyboard controller, or the battery. Finally, wear and tear and overly forceful pressing or overuse of commonly used keys may cause tearing or fracture of portions of the rubber dome layer.

In existing systems, these internal components of a keyboard assembly may be difficult or impossible to access without risking further damage to the keyboard assembly. Such attempted access may, for example, crack the outer casing of the keyboard assembly housing these components, damage electrical coupling between various components, or result in misalignment between the various layers, causing inaccurate or failed keystroke registration. As such, when any one of these individual internal components fail or break in such a way in existing systems, users often opt to replace the entire keyboard assembly, rather than attempt to repair such damage. This may result in significant waste and have a negative impact on the environment. A system is needed that allows for easy user access and repair of these various internal keyboard assembly components to deter such unnecessary waste.

The sustainable and user-repairable keyboard structure in embodiments of the present disclosure address this issue by incorporating a plurality of user-replaceable keyboard component layers. A plurality of the user-replaceable keyboard component layers have housing guide magnetic gaskets for aligning and magnetically coupling to another of the keyboard component layers, and each being separable from one another by a user exerting force to overcome a magnetic coupling between two or more of the plurality of guide magnetic gaskets. These replaceable layers may be housed within a keyboard bottom case fixed to a keyboard top case via a plurality of user-removable fasteners, such as snaps, slide latches, or screws. This may allow the user to easily separate the top and bottom cases, and detaching the various layers from one another by separating the magnetic gaskets to expose one or more damaged components in need of replacement with little or no need for tools to do so. Upon such a separation, the user may replace damaged components such as a dry cell battery, a rechargeable battery, a keyboard controller, an electrical key press detection membrane, a rubber dome layer, or any one of the keys, on an individual basis. Following such replacement, the user may easily reassemble each of the layers by magnetically coupling the gaskets for each layer to the gasket for another layer, then reattaching the top and bottom cases through replacement of the fasteners. In such a way, the sustainable and user-repairable keyboard structure in embodiments of the present disclosure may provide an easy way for user to access and repair each of these various internal keyboard assembly components, rather than disposing of the entire keyboard assembly, thus deterring unnecessary waste.

FIG. 1 illustrates an information handling system 100 according to several aspects of the present disclosure. In various embodiments described herein, a user-repairable keyboard structure 190 of a wired or wireless keyboard 154 may be operatively coupled to the information handling system 100 such that various damaged components of the user-repairable keyboard structure 190 may be removable and replaceable with respect to other functioning components of the user-repairable keyboard structure 190 and with respect to the information handling system 100. This may allow for replacement of damaged components of the user-repairable keyboard structure 190, rather than replacement of the entire user-repairable keyboard structure 190 of the wired or wireless keyboard 154, which may result in increased waste and negative environmental impacts.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, various input and output (I/O) devices 110, a keyboard 154, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 160, a static memory 103 or drive unit 107, a video display 109, wired or wireless keyboard 154, or other components of an information handling system. Battery 105 or A/C power adapter 106 may be operatively coupled to the replaceable keyboard battery 153 via an electrically conductive wire if the keyboard 154 is wired. In an alternative embodiment, keyboard 154 may be wireless and be powered with a replaceable keyboard battery 153 that is rechargeable via a wired coupling to battery 105 or A/C power adapter 106. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The user-repairable keyboard structure 190 of the wired or wireless keyboard 154 in an embodiment may further include one or more user-replaceable internal components. For example, the user-repairable keyboard structure 190 in an embodiment may include the replaceable keyboard battery 153, which may function as a dry cell battery or a rechargeable battery. The user-repairable keyboard structure 190 in another embodiment may include a replaceable electrical key press detection membrane 140 operatively coupled to the replaceable keyboard battery 153 or receiving power from the PMU 104 of the information handling system 100. In an embodiment, the user-repairable keyboard structure 190 may further include a replaceable keyboard controller 151 that is operatively coupled to the replaceable electrical key press detection membrane 140 and either the replaceable keyboard battery 153 or the PMU 104. The user-repairable keyboard structure 190 in another embodiment may include a replaceable rubber dome layer 130 that is operatively connected to the replaceable electrical key press detection membrane 140 and provides for the replaceable electrical key press detection membrane 140 to detect key presses and provide rebound of the pressed key. As described in greater detail herein, other user-repairable components of the sustainable and replaceable keyboard assembly 190 may include replaceable keys, replaceable keyboard microcontroller board that may include the replaceable keyboard controller, a wireless radio, port connector hardware (not shown), or other structures and components. The replaceable electrical key press detection membrane 140 in various embodiments herein, may communicate a detected keystroke to the replaceable keyboard controller 151, which may include a microcontroller or other microprocessor, for further communication via bus 108, or via a wireless link such as a Bluetooth® wireless link to hardware processor 101.

In an embodiment, the replaceable keyboard battery 153 may be inserted into a battery port housed within a keyboard bottom case of the user-repairable keyboard structure. This battery port in an embodiment may be operatively coupled (e.g., via a conductive wire or electrical lead) to a controller port also housed within the keyboard bottom case for insertion of the replaceable keyboard controller 151, and for operative coupling between the replaceable keyboard battery 153 and the replaceable keyboard controller 151. The replaceable keyboard controller 151 in an embodiment may be formed with conductive contacts for operative coupling to the replaceable electrical key press detection membrane 140, a portion of which may be placed into electrical contact with the conductive contacts during the assembly process for the user-repairable keyboard structure 190.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101. The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101.

The wireless adapter and network interface device 160 may provide connectivity of the information handling system 100 to wireless peripheral devices such as keyboard 154 or to the network 170 via a network access point (AP) in an embodiment. The network 170 in some embodiments may be a wired local area network (LAN), a wireless personal area network (WPAN) including a Bluetooth® or Bluetooth® Low Energy (BLE) WPAN, a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
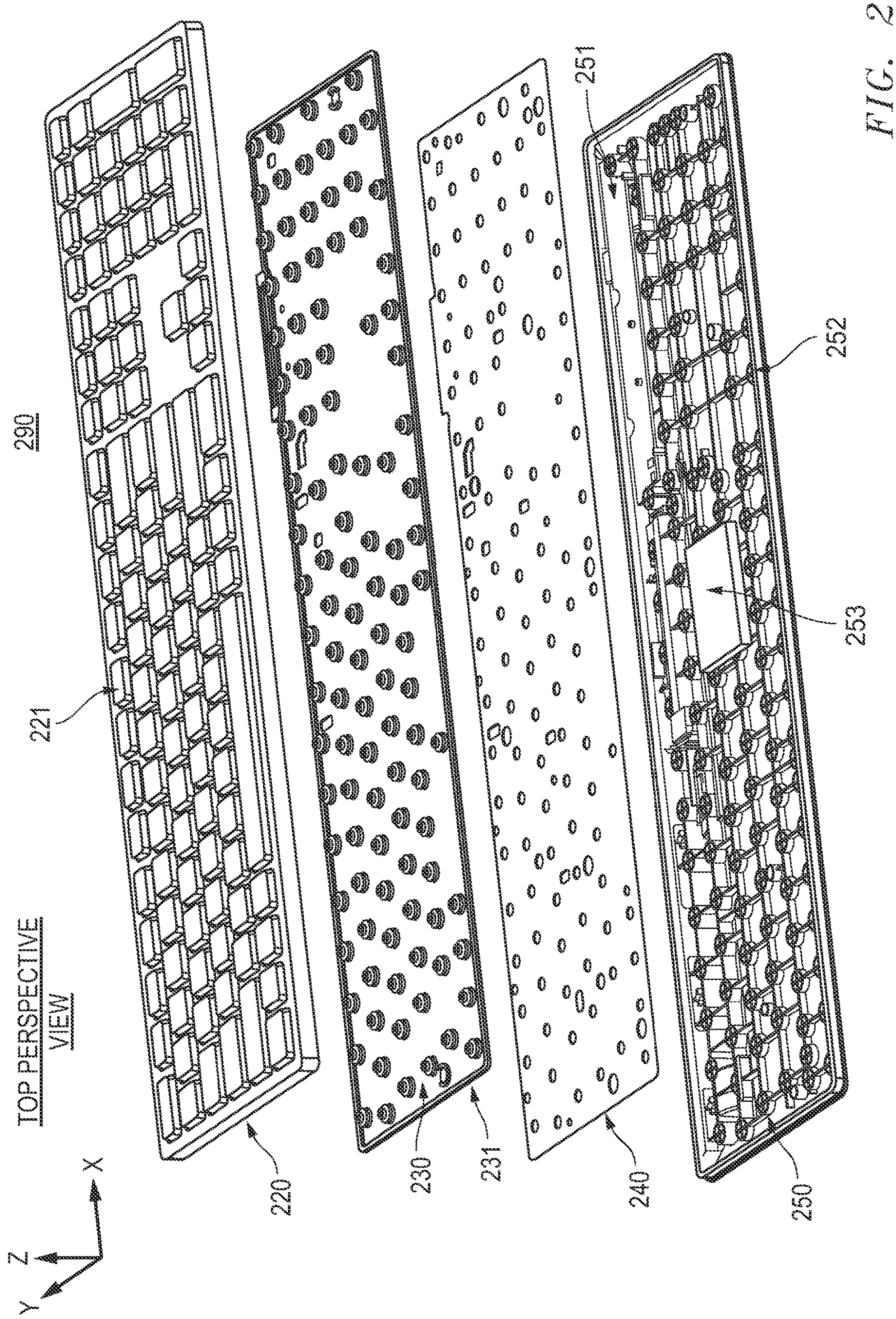
FIG. 2 is a graphical diagram illustrating an exploded, perspective, top view of a repairable keyboard structure according to an embodiment of the present disclosure.

FIG. 2 is a graphical diagram illustrating an exploded perspective top view of a repairable keyboard structure with stacking user-replaceable components according to an embodiment of the present disclosure. A keyboard bottom case 250 may be formed with a bottom case guide magnetic gasket 252, a battery port for insertion of replaceable battery 253, and a controller port in the side of the keyboard operatively coupled toa keyboard controller printed circuit board (PCB) 251 having a keyboard controller and other components. The bottom case guide magnetic gasket 252 in an embodiment may guide alignment and operative coupling with the keyboard top case 220. The keyboard controller PCB 251 may be installed and releasable via plastic hooks or other fastener devices in embodiments herein. As described in greater detail with respect to FIG. 1, the battery port in an embodiment may be operatively coupled to the controller port within the keyboard bottom case 250 for charging the replaceable battery 253 and for providing power to the keyboard controller PCB 251 and its components. A new or replacement dry cell or rechargeable battery 253 may be inserted into the battery port of the keyboard bottom case 250 in an embodiment. As described in greater detail above with respect to FIG. 1, the replaceable battery 253 may provide power to the keyboard controller PCB 251 and to a replaceable electrical key press detection membrane 240.

A replaceable keyboard controller PCB 251 in an embodiment may be formed for operatively coupling the replaceable keyboard controller PCB 251 with a replaceable electrical key press detection membrane 240. A new or replacement keyboard controller PCB 251 may be inserted within the controller port of the keyboard bottom case 250 and installed via the plastic hooks in an embodiment. The keyboard controller PCB 251 and its components is operatively coupled to the replaceable keyboard battery 253 via a conductive wire, PCB trace or other conductive path. A new or replacement replaceable electrical key press detection membrane 240 may be placed within the keyboard bottom case 250, such that the outer perimeter of the replaceable electrical key press detection membrane 240 is inserted or disposed entirely inside the bottom case guide magnetic gasket 252. In an embodiment, upon such an insertion of the replaceable electrical key press detection membrane 240, the replaceable electrical key press detection membrane 240 may be disposed beneath a planar surface of the bottom case guide magnetic gasket 252, as described in greater detail below with respect to FIGS. 6A and 6B.

In an embodiment, the replaceable electrical key press detection membrane 240 may be placed in at least partial contact with conductive contacts for the replaceable keyboard controller PCB 251 to operatively couple the replaceable electrical key press detection membrane 240 and the replaceable keyboard controller PCB 251, as described in greater detail below with respect to FIG. 3. The replaceable electrical key press detection membrane 240 may operate to detect keystrokes upon user-applied downward force of one of the keys (e.g., 221) of the keyboard top case 220, forcing a portion of a replaceable rubber dome layer 230 downward and into physical contact with the replaceable electrical key press detection membrane 240. In an embodiment, the replaceable electrical key press detection membrane 240 may communicate such a detected keystroke to the replaceable keyboard controller PCB 251 and the replaceable keyboard controller.

A replaceable rubber dome layer 230 may be formed in an embodiment for actuating keys (e.g., 221) of the keyboard top case 220. In an embodiment, the replaceable rubber dome layer 230 may include a rubber dome guide magnetic gasket 231 for alignment and operative coupling to the replaceable electrical key detection membrane 240. A new or replacement replaceable rubber dome layer 230 in an embodiment may be situated above the replaceable electrical key press detection membrane. The replaceable rubber dome layer 230 in such an embodiment may be aligned with and operatively coupled to the replaceable electrical key press detection membrane 240 via magnetic coupling of the rubber dome guide magnetic gasket 231 and an electrical membrane guide magnetic gasket (e.g., as described in greater detail below with respect to 441 in FIGS. 4 and 641 in FIG. 6C).

A keyboard top case 220 may be formed in an embodiment with removeable and replaceable keys 221. The keyboard top case 220 may be situated above, aligned with, and operatively coupled to the replaceable rubber dome layer 230, via magnetic coupling of the inner guide magnetic gasket of the keyboard top case 220 (e.g., as described in greater detail below with respect to 422 in FIGS. 4 and 622 in FIG. 6C) and the rubber dome guide magnetic gasket 231. The keyboard top case 220 in an embodiment may also be aligned with and operatively coupled to the keyboard bottom case via magnetic coupling of the keyboard top case outer guide magnetic gasket (e.g., as described in greater detail below with respect to 423 in FIGS. 4 and 623 in FIG. 6B) and the bottom case guide magnetic gasket 252. Any one of the individual keys 221 of the keyboard top case 220 in an embodiment may be removeable from the keyboard top case 220 by pressing on them from underneath the keyboard top case 230, and replaced with new or replacement keys. Individual keys 221 are aligned over and operatively coupled for rubber domes of the replaceable rubber dome layer 230 to receive downward actuation of key 221 by a user. The magnetic coupling of the keyboard top case outer guide magnetic gasket and the bottom case guide magnetic gasket 252 in an embodiment may act to enclose the replaceable keyboard battery, the replaceable keyboard controller PCB 251, the replaceable electrical key press detection membrane, and the replaceable rubber dome layer within a keyboard structure formed by the joining of the keyboard top case 220 and the keyboard bottom case 250. The keyboard top case 220 may be further fixed to the keyboard bottom case 250 in an embodiment via one or more fasteners, such as screws, slide latches, or snaps, for example.

Figure 3:
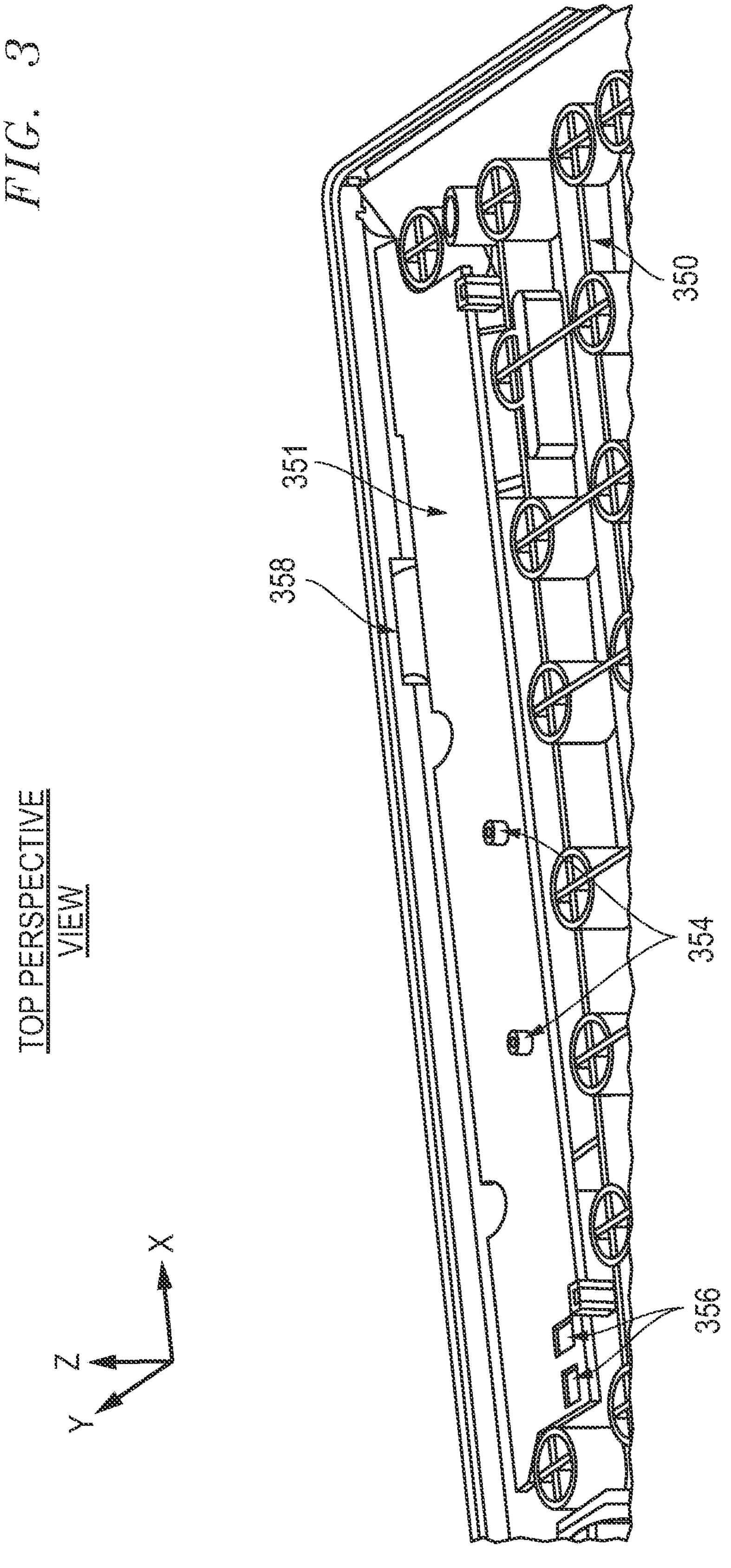
FIG. 3 is a graphical diagram illustrating a perspective view of a replaceable keyboard controller within a keyboard bottom case according to an embodiment of the present disclosure.

FIG. 3 is a graphical diagram illustrating a perspective view of a replaceable keyboard controller and printed circuit board (PCB) inserted within a keyboard controller port of a keyboard bottom case according to an embodiment of the present disclosure. A keyboard bottom case 350 in an embodiment may be formed with keyboard controller PCB posts 354, keyboard controller PCB hooks 359, and a controller port 358 for insertion of a replaceable keyboard controller PCB 351. A new or replacement keyboard controller PCB 351 with a keyboard controller chip and other components including keyboard radio and port connector hardware mounted thereon (not shown) in an embodiment may be inserted within the controller port 358 of the keyboard bottom case 350 such that the bottom case keyboard controller PCB posts 354 insert through the keyboard controller post openings and keyboard controller PCB hooks 459 operatively couple the keyboard controller PCB 351 to keyboard bottom case 350.

The replaceable keyboard controller PCB 351 in an embodiment may be formed with bottom case post openings through which the keyboard controller PCB posts 354 may be inserted, and conductive contacts 356 for operatively coupling the replaceable keyboard controller PCB 351 to a replaceable electrical key press detection membrane. The replaceable electrical key press detection membrane may be placed in contact with conductive contacts 356 for the replaceable keyboard controller PCB 351 to operatively couple the replaceable electrical key press detection membrane and the replaceable keyboard controller PCB 351. The replaceable keyboard controller PCB 351 is also operatively coupled to a power source, such as a replaceable battery, to power the keyboard controller and other components on the keyboard controller PCB 351 via a wire or other conductive path to the replaceable battery (not shown).

Figure 4:
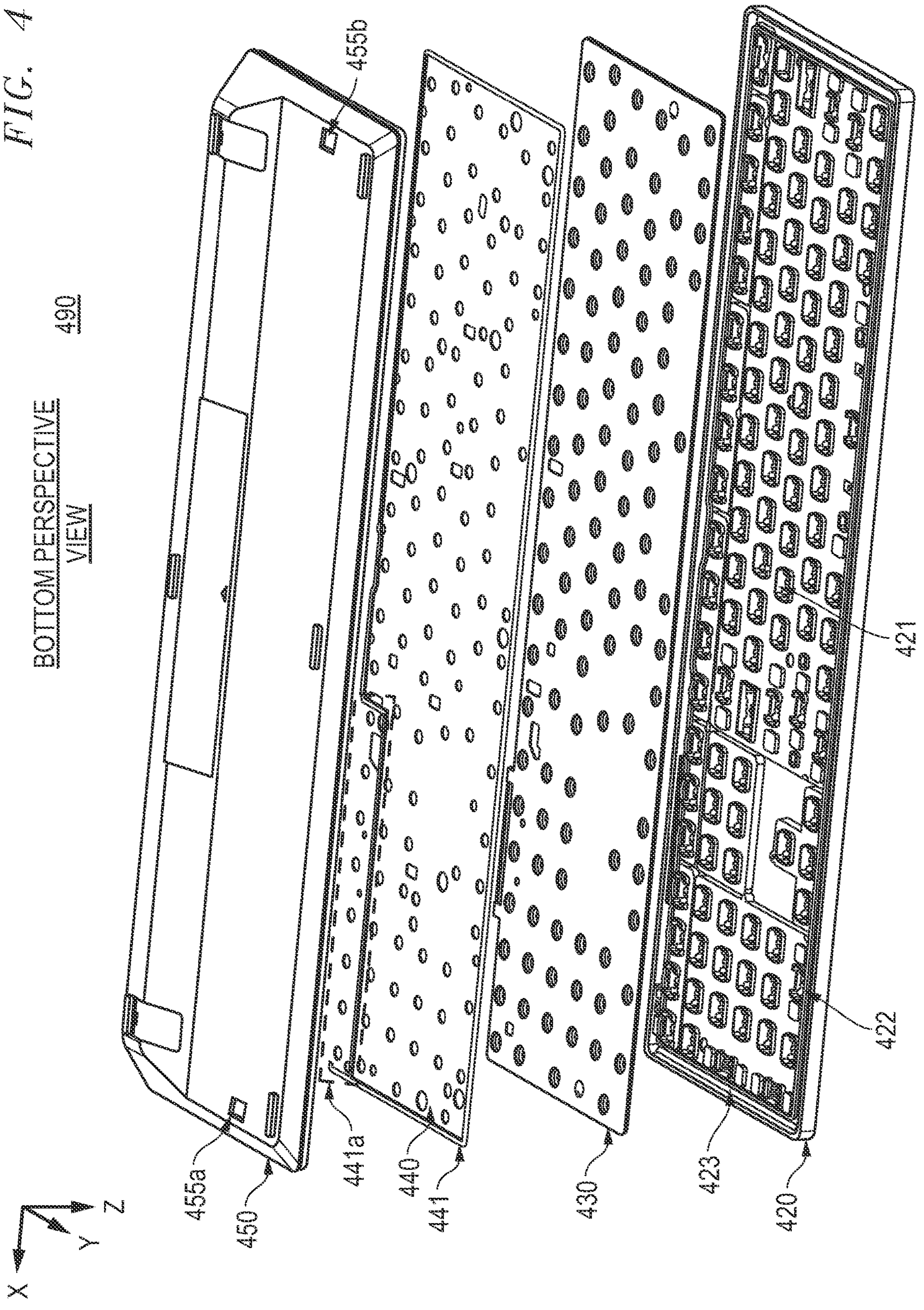
FIG. 4 is a graphical diagram illustrating an exploded, perspective, bottom view of a repairable keyboard structure according to an embodiment of the present disclosure.

FIG. 4 is a graphical diagram illustrating an exploded perspective bottom view of a repairable keyboard structure with stacking user-replaceable components according to an embodiment of the present disclosure. A keyboard bottom case 450 in an embodiment may be formed with openings for top and bottom case fasteners 455*a* and 455*b*. Fasteners 455*a* and 455*b* are shown as slide latches in FIG. 4, but it is contemplated that adhesive, screws, or friction fasteners may be used as well. A replaceable electrical key press detection membrane 440 may be formed with an electrical membrane guide magnetic gasket 441 for alignment and operative coupling to the replaceable rubber dome layer 430. The electrical membrane guide magnetic gasket 441 in an embodiment may include a notched gasket portion 441*a* for alignment with the keyboard controller PCB housed within the keyboard bottom case 450. The replaceable electrical key press detection membrane 440 in an embodiment may be disposed within the keyboard bottom case 450, such that the notched gasket portion 441*a* of the electrical membrane guide magnetic gasket 441 aligns with at least two sides of the replaceable keyboard controller PCB housed within the keyboard bottom case 450, such as below and beside an interior side wall of the replaceable keyboard controller.

A replaceable rubber dome layer 430 in an embodiment may be formed for actuating keys (e.g., 221 of FIG. 2) of the keyboard top case 420, including a rubber dome guide magnetic gasket (e.g., 231 of FIG. 2) for alignment and operative coupling to the electrical membrane guide magnetic gasket 441 of the replaceable electrical key press detection membrane 440 and for alignment and operative coupling to the inner guide magnetic gasket 422 of the keyboard top case 420. The replaceable rubber dome layer 430 in an embodiment may be situated between the replaceable electrical key press detection membrane 440 and the keyboard top case 420. In an embodiment, the replaceable rubber dome layer 430 may be aligned with and operatively coupled to the replaceable electrical key press detection membrane 440 via magnetic coupling of the rubber dome guide magnetic gasket (e.g., 231 in FIG. 2) and the electrical membrane guide magnetic gasket 441, as described in greater detail below with respect to FIG. 6C. The domes of the replaceable rubber dome layer 430 may be aligned under keys 421 of the keyboard top case 420 and operatively coupled to each key to receive keypress actuation of keys 421.

A keyboard top case 420 in an embodiment may be formed with an outer guide magnetic gasket 423 for guiding alignment and operative coupling of the keyboard top case 420 and the keyboard bottom case 450, and an inner guide magnetic gasket 422 for alignment and operative coupling to the rubber dome guide magnetic gasket 422 of the replaceable rubber dome layer 430. The keyboard bottom case 450 in an embodiment may be further operatively coupled to the keyboard top case 420 via top and keyboard bottom case fasteners. Such fasteners may include sliding latches, screws, or other fasteners disposed within the openings 455*a* and 455*b*, as described in greater detail below with respect to FIG. 5.

Figure 5:
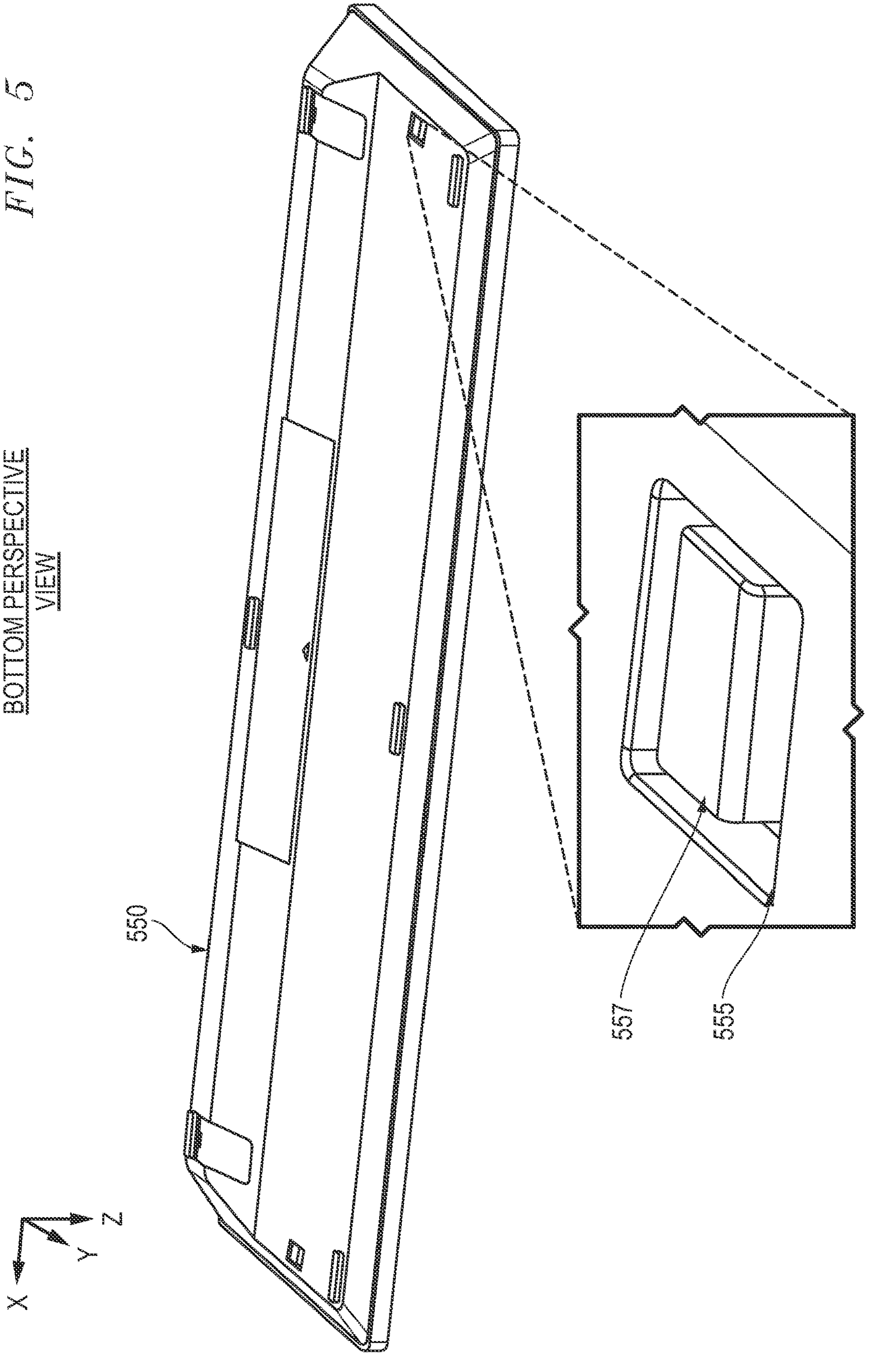
FIG. 5 is a graphical diagram illustrating a perspective bottom view of a keyboard bottom case including keyboard top and bottom case fasteners according to an embodiment of the present disclosure.

FIG. 5 is a graphical diagram illustrating a perspective bottom view of a keyboard bottom case including keyboard top and bottom case sliding latch fasteners according to an embodiment of the present disclosure. A keyboard bottom case 550 may be formed in an embodiment with openings (e.g., 555) for top and bottom case fasteners (e.g., 557). The keyboard bottom case 550 in an embodiment may be fixed to the keyboard top case via top and keyboard bottom case fasteners (e.g., 557). Such fasteners may include sliding latches 557, screws, or other fasteners disposed within the openings (e.g., 555) so they do not protrude from keyboard bottom case 550 in some embodiments.

Figure 6A:
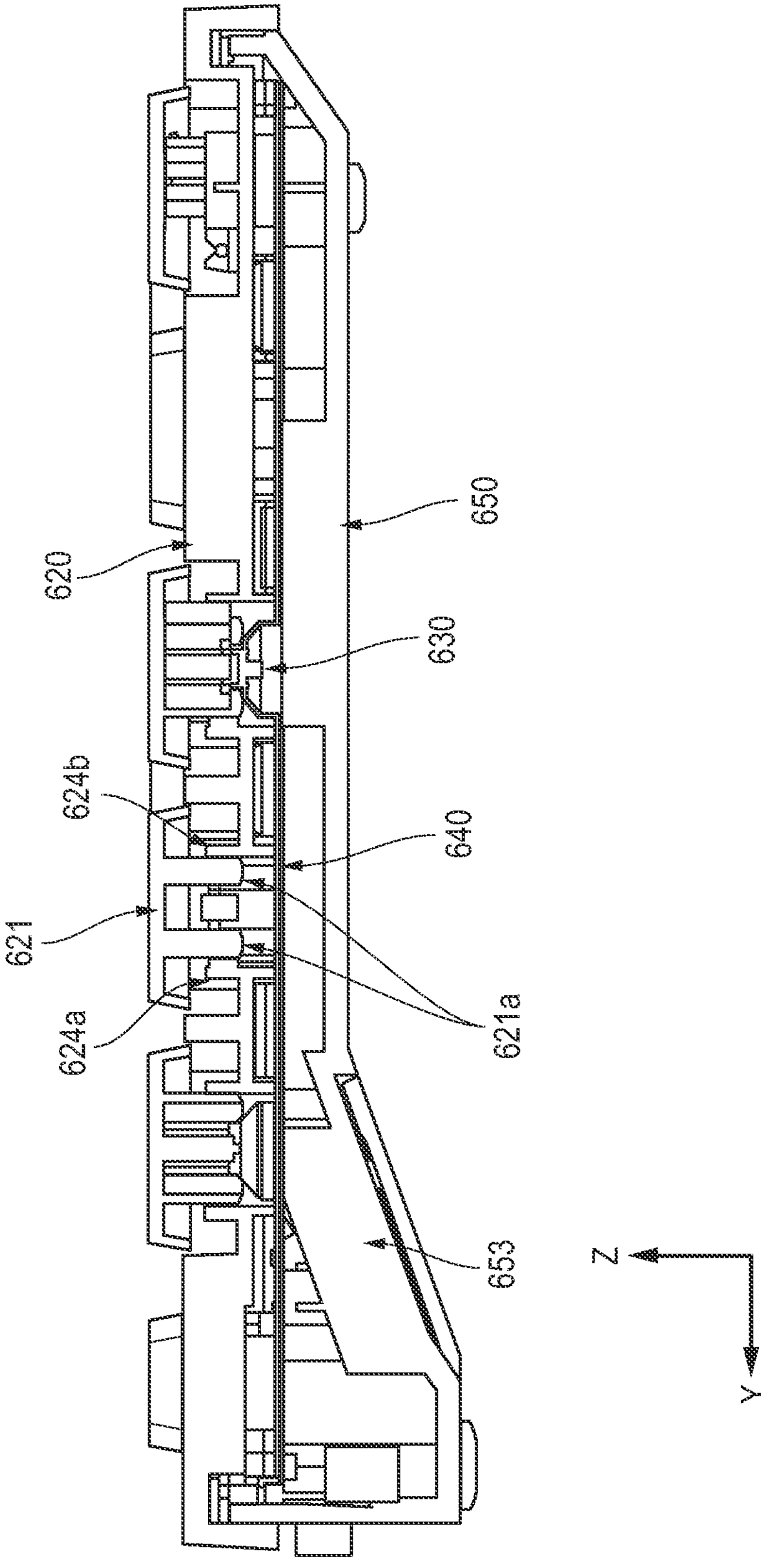
FIG. 6A is a graphical diagram illustrating a cross-sectional side view of a repairable keyboard structure according to an embodiment of the present disclosure.

FIG. 6A is a graphical diagram illustrating a cross-sectional side view of a repairable keyboard structure with stacking user-replaceable components according to an embodiment of the present disclosure. A keyboard bottom case 650 in an embodiment may be formed of any suitable material, such as plastics, aluminum, or other materials, with a battery port for operative coupling of replaceable keyboard battery 653 with the components of the keyboard in an embodiment, and a bottom case guide magnetic gasket for guiding alignment and operative coupling of the keyboard bottom case 650 to the keyboard top case 620 (e.g., as described in greater detail with respect to FIG. 6B, below) to enclose the replaceable keyboard battery 653, a replaceable rubber dome layer 630, and a replaceable electrical key press detection membrane 640. A new or replacement dry cell or rechargeable battery 653 may be inserted into the battery port of the keyboard bottom case 650 in an example embodiment.

A replaceable electrical key press detection membrane 640 may be formed with an electrical membrane guide magnetic gasket for alignment and operative coupling to the replaceable rubber dome layer 630 (e.g., as described in greater detail with respect to FIG. 6C, below). The replaceable electrical key press detection membrane 640 in an embodiment may be placed in contact with conductive contacts for a keyboard controller housed within the keyboard bottom case 650 to operatively couple the replaceable electrical key press detection membrane 640 and the keyboard controller.

A replaceable rubber dome layer 630 be formed in an embodiment for actuating keys (e.g., 621) of the keyboard top case 620, including a rubber dome guide magnetic gasket for alignment and operative coupling of the replaceable rubber dome layer 630 to the replaceable electrical key detection membrane 640, as described in greater detail below with respect to FIG. 6C. The replaceable rubber dome layer 630 in an embodiment may be aligned with and operatively coupled to the replaceable electrical key press detection membrane 640 via magnetic coupling of a rubber dome guide magnetic gasket and the electrical membrane guide magnetic gasket, as described in greater detail below with respect to FIG. 6C.

Figure 6B:
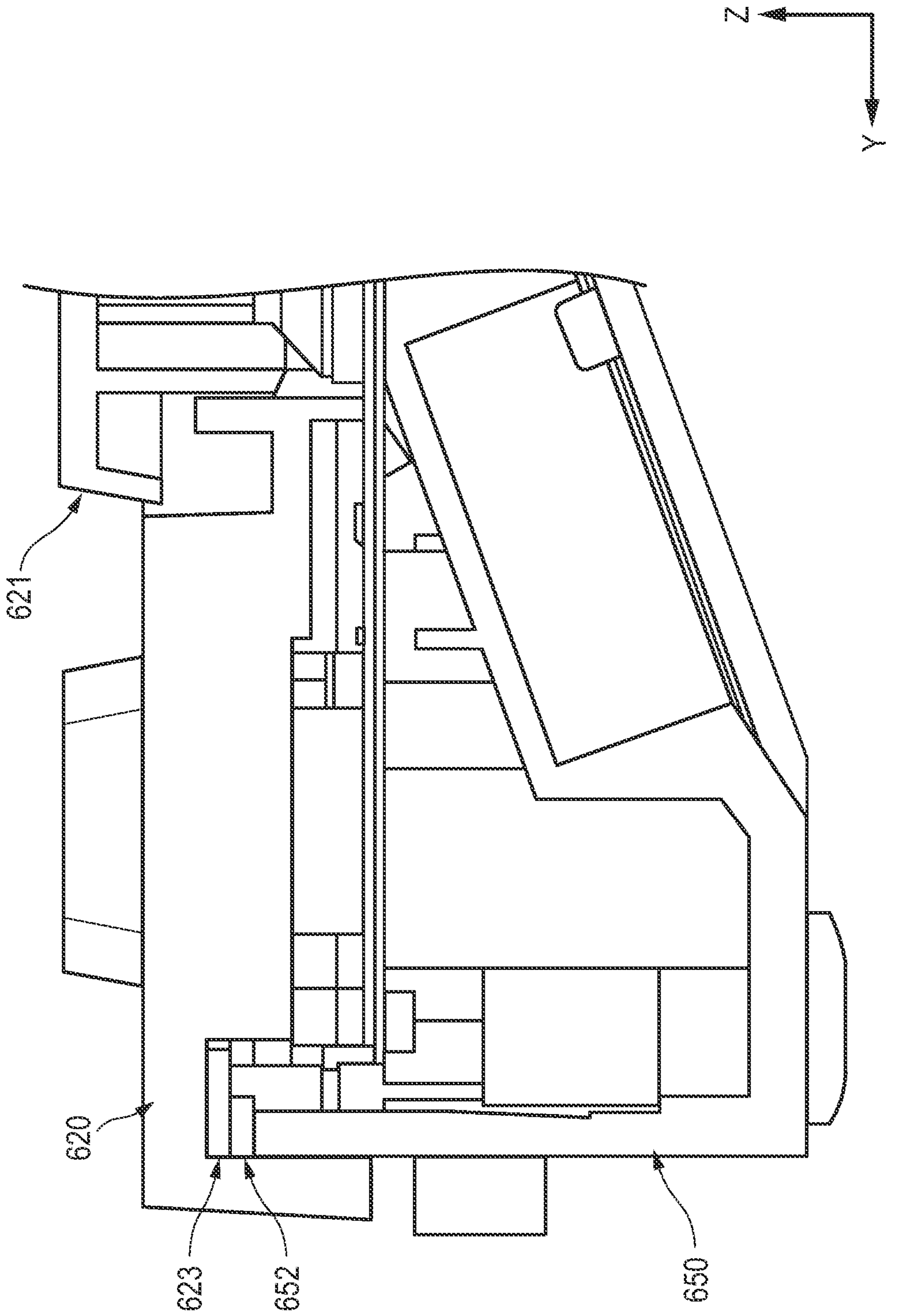
FIG. 6B is a graphical diagram illustrating a partial cross-sectional side view of a repairable keyboard structure with a keyboard top case and a keyboard bottom case according to an embodiment of the present disclosure.
Figure 6C:
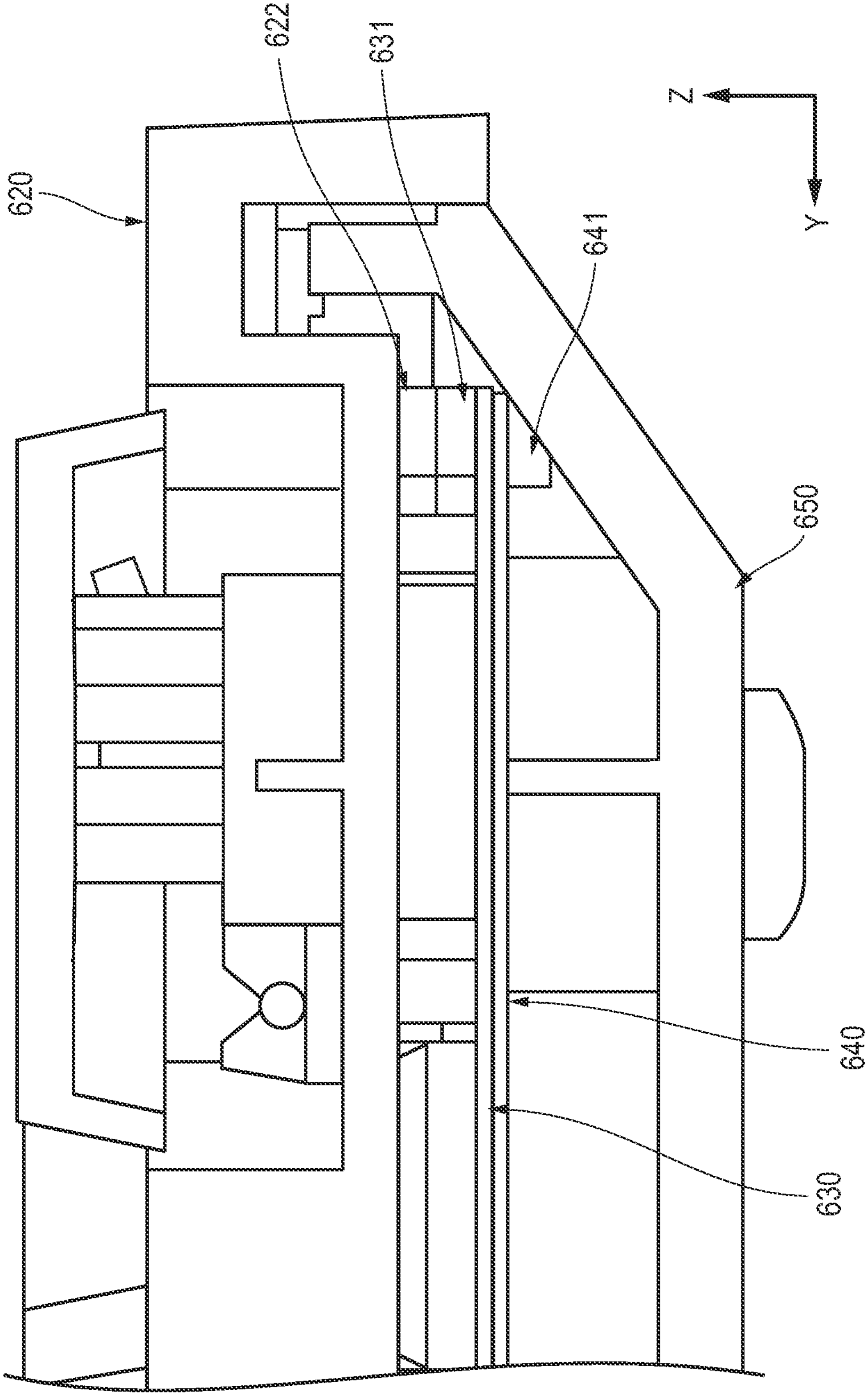
FIG. 6C is a graphical diagram illustrating partial cross-sectional side view of a repairable keyboard structure with a keyboard top case, a replaceable rubber dome layer and a replaceable electrical key press detection membrane according to an embodiment of the present disclosure.

In an embodiment, a keyboard top case 620 may be formed with removeable and replaceable keys 621, an outer guide magnetic gasket for guiding alignment and operative coupling of the keyboard top case 620 and the keyboard bottom case 650 (e.g., as described in greater detail with respect to FIG. 6B, below), and an inner guide magnetic gasket for alignment and operative coupling to the replaceable rubber dome layer 630 and to the replaceable electrical key detection membrane 640 (e.g., as described in greater detail with respect to FIG. 6C, below). The keys 621 of the keyboard top case 620 in an embodiment may be removed by from the keyboard top case 620 by separating the keyboard top case 620 from the keyboard bottom case 650 and the replaceable rubber dome layer 630, then applying sufficient force to a bottom side 621*a* of the replaceable key 621 to dislodge the key 621 from the snaps 624*a* and 624*b* holding the replaceable key 621 within the keyboard top case 620. The keyboard top case 620 in an embodiment may be aligned with and operatively coupled to the replaceable rubber dome layer 630 via magnet connection of an inner guide magnetic gasket of the keyboard top case 620 and a rubber dome guide magnetic gasket of the replaceable rubber dome layer 630, as described in greater detail below with respect to FIG. 6C. The keyboard top case 620 in an embodiment may also be aligned with and operatively coupled to the keyboard bottom case 650 via magnetic coupling of a keyboard top case outer guide magnetic gasket and a bottom case guide magnetic gasket, as described in greater detail below with respect to FIG. 6C.

FIG. 6B is a graphical diagram illustrating a partial cross-sectional side view of a repairable keyboard structure with a keyboard top case and a keyboard bottom case aligned and operatively coupled via magnetic guide gaskets according to an embodiment of the present disclosure. A keyboard bottom case 650 may be formed with a bottom case guide magnetic gasket 652 to guide alignment and operative coupling of the keyboard bottom case 650 and the keyboard top case 620 in an embodiment. The keyboard top case 620 may be formed in an embodiment with removeable and replaceable keys 621, and an outer guide magnetic gasket 623 for guiding alignment and operative coupling of the keyboard top case 620 to the keyboard bottom case 650 via magnetic coupling to the bottom case guide magnetic gasket 652.

FIG. 6C is a graphical diagram illustrating partial cross-sectional side view of a repairable keyboard structure with a keyboard top case, a replaceable rubber dome layer and a replaceable electrical key press detection membrane aligned and operatively coupled via magnetic guide gaskets according to an embodiment of the present disclosure. A replaceable electrical key press detection membrane 640 may be housed within the keyboard bottom case 650 and formed with an electrical membrane guide magnetic gasket 641 for alignment and operative coupling to the replaceable rubber dome layer 630. The replaceable rubber dome layer 630 may be formed in an embodiment, including a rubber dome guide magnetic gasket 631 for alignment and operative coupling to the keyboard top case 620. In an embodiment, the replaceable rubber dome layer 630 may also include the rubber dome guide magnetic gasket 631 for alignment and operative coupling to the replaceable electrical key detection membrane 640. For example, the replaceable rubber dome layer 630 in an embodiment may be aligned with and attached to the replaceable electrical key press detection membrane 640 via magnetic coupling of the rubber dome guide magnetic gasket 631 and the electrical membrane guide magnetic gasket 641.

The keyboard top case 620 may be formed with an inner guide magnetic gasket 622 for alignment and operative coupling to the replaceable rubber dome layer 630. The keyboard top case 620 in an embodiment may be aligned with and attached to the replaceable rubber dome layer 630 via magnetic coupling of the inner guide magnetic gasket 622 of the keyboard top case 620 and the rubber dome guide magnetic gasket 631.

Figure 7:
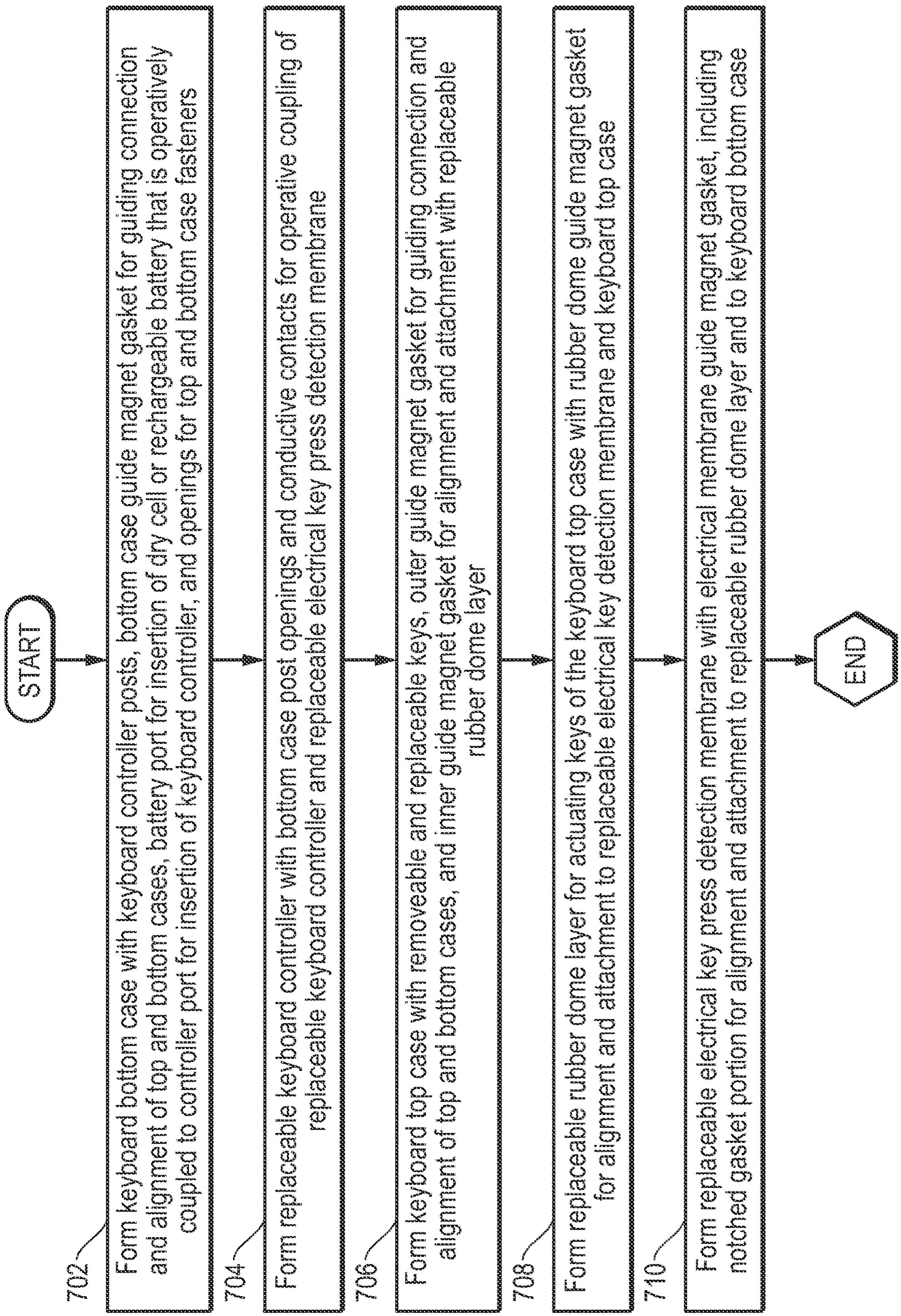
FIG. 7 is a flow diagram illustrating a method of forming user-replaceable internal components for a keyboard structure according to an embodiment of the present disclosure.

FIG. 7 is a flow diagram illustrating a method of forming a plurality of stackable user-replaceable internal components of a repairable keyboard structure according to an embodiment of the present disclosure. As described herein, the sustainable and user-repairable keyboard structure in an embodiment may incorporate a plurality of user-replaceable keyboard component layers, any of which may have guide magnetic gaskets for aligning and magnetically coupling to another of the keyboard component layers, and each being separable from one another by a user exerting force to overcome a magnetic coupling between two or more of the plurality of guide magnetic gaskets. These replaceable layers may be housed within a keyboard bottom case fixed to a keyboard top case via a plurality of user-removable fasteners, such as snaps, slide latches, or screws. This may allow the user to easily separate the top and bottom cases, and detaching the various layers from one another by separating the magnetic gaskets to expose one or more damaged components in need of replacement.

At block 702, a keyboard bottom case may be formed with keyboard controller PCB posts and keyboard controller PCB hooks, openings for top and bottom case fasteners, a bottom case guide magnetic gasket, a battery port for operative coupling of replaceable battery to power the keyboard, and a controller port and area for insertion of a keyboard controller PCB. The bottom case guide magnetic gasket in an embodiment may guide alignment and operative coupling of top and keyboard bottom cases in an embodiment. The battery port in an embodiment may be operatively coupled to the keyboard controller PCB and controller port within the keyboard bottom case to provide for recharging of the battery installed there. For example, in an embodiment described with respect to FIG. 1, the replaceable keyboard battery 153 may be inserted into a battery port formed within a keyboard bottom case of the user-repairable keyboard structure to provide power to the keyboard and the keyboard controller PCB. This battery port in an embodiment may be operatively coupled (e.g., via a conductive wire or electrical lead) to components of the keyboard controller PCB as well as a controller port also formed housed within the keyboard bottom case. The controller port may be operatively coupled to port connector hardware mounted on the keyboard controller PCB which also includes the replaceable keyboard controller 151. Further, the operative coupling between the replaceable keyboard battery 153 and the replaceable keyboard controller PCB provides for power to the wired or wireless keyboard 154 and other components on the replaceable keyboard controller PCB.

In another example embodiment described with reference to FIG. 2, a keyboard bottom case 250 may be formed with a bottom case guide magnetic gasket 252, a battery port for insertion of replaceable battery 253 to power the keyboard, and a controller port operatively coupled to a keyboard controller PCB 251. The keyboard bottom case 250 may be formed with keyboard controller PCB posts and keyboard controller PCB fasteners for mounting the keyboard controller PCB 251 in embodiments herein. The bottom case guide magnetic gasket 252 in an embodiment may guide alignment and operative coupling with the keyboard top case 220. In still another example described with respect to FIG. 3, a keyboard bottom case 350 may be formed with keyboard controller PCB posts 354, keyboard controller PCB hooks 359 and a controller port operatively coupling a replaceable keyboard controller PCB 351 to the keyboard bottom case 350. In yet another example described with reference to FIG. 4, a keyboard bottom case 450 may be formed with openings for top and bottom case fasteners 455*a* and 455*b*. As a further example described in embodiment with respect to FIG. 5, a keyboard bottom case 550 may be formed with openings (e.g., 555) for top and bottom case fasteners (e.g., 557). In still another example embodiment described with reference to FIGS. 6A and 6B, a keyboard bottom case 650 in an embodiment may be formed with a battery port operatively coupled to the replaceable keyboard battery 653 for powering the keyboard, and a bottom case guide magnetic gasket 652 for guiding alignment and operative coupling of the keyboard bottom case 650 to the keyboard top case 620 to enclose the replaceable keyboard battery 653, a replaceable rubber dome layer 630 and a replaceable electrical key press detection membrane 640.

A replaceable keyboard controller PCB with a replaceable keyboard controller and other components in an embodiment may be formed at block 704 with bottom case post openings and conductive contacts for operatively coupling the replaceable keyboard controller and a replaceable electrical key press detection membrane in the keyboard. For example, in an embodiment described with reference to FIG. 1, the replaceable keyboard controller 151 may be formed on a PCB with conductive contacts for operative coupling to the replaceable electrical key press detection membrane 140, a portion of which may be placed into physical contact with the conductive contacts during the assembly process for the user-repairable keyboard structure 190. In another example embodiment described with respect to FIG. 2, a replaceable keyboard controller PCB 251 may be formed with a replaceable keyboard controller, port connector hardware, a power management system, keyboard wireless radio and other components. The replaceable keyboard controller PCB 251 is operatively coupled to a replaceable electrical key press detection membrane 240, via one or more conductive contacts on the keyboard controller PCB 251. In still another example embodiment described with respect to FIG. 3, the replaceable keyboard controller PCB 351 may be formed with bottom case post openings through which the keyboard controller PCB posts 354 may be inserted, and conductive contacts 356 for operatively coupling the replaceable keyboard controller PCB 351 and a replaceable electrical key press detection membrane.

At block 706, a keyboard top case may be formed in an embodiment with removeable and replaceable keys, an outer guide magnetic gasket for guiding alignment and operative coupling of top and keyboard bottom cases, and an inner guide magnetic gasket for alignment and operative coupling to a replaceable rubber dome layer and replaceable electrical key press detection membrane. For example, in an embodiment described with reference to FIG. 2, a keyboard top case 220 may be formed with removeable and replaceable keys 221. In another example embodiment described with reference to FIG. 4, a keyboard top case 420 may be formed with an outer guide magnetic gasket 423 for guiding alignment and operative coupling of the keyboard top case 420 and the keyboard bottom case 450, and an inner guide magnetic gasket 422 for alignment and operative coupling to the rubber dome guide magnetic gasket 422 of the replaceable rubber dome layer 430, and replaceable electrical key press detection membrane 440.

In an embodiment described with reference to FIGS. 6A and 6B, for example, a keyboard top case 620 may be formed with removeable and replaceable keys 621, an outer guide magnetic gasket 623 for guiding alignment and operative coupling of the keyboard top case 620 and the keyboard bottom case 650, via magnetic coupling to the bottom case guide magnetic gasket 652. The keys 621 of the keyboard top case 620 in an embodiment may be removed from the keyboard top case 620 by separating the keyboard top case 620 from the keyboard bottom case 650, the replaceable rubber dome layer 630, and the replaceable electrical key press detection membrane 640, then applying sufficient force to a bottom side 621*a* of the replaceable key 621 to dislodge the key 621 from the snaps 624*a* and 624*b* holding the replaceable key 621 within the keyboard top case 620. In another example embodiment described with reference to FIGS. 6A and 6C, the keyboard top case 620 may be formed with an inner guide magnetic gasket 622 for alignment and operative coupling to the replaceable rubber dome layer 630, and to the replaceable electrical key press detection membrane 640.

A replaceable rubber dome layer be formed in an embodiment at block 708 for actuating keys of the keyboard top case, including a rubber dome guide magnetic gasket for alignment and operative coupling to a replaceable electrical key detection membrane. For example, in an embodiment described with reference to FIG. 2, a replaceable rubber dome layer 230 may be formed for actuating keys 221 of the keyboard top case 220. In an embodiment, the replaceable rubber dome layer 230 may include a rubber dome guide magnetic gasket 231 for alignment and operative coupling to the replaceable electrical key detection membrane 240. In another example embodiment described with reference to FIG. 4, a replaceable rubber dome layer 430 may be formed for actuating keys (e.g., 221 of FIG. 2) of the keyboard top case 420, including a rubber dome guide magnetic gasket (e.g., 231 of FIG. 2) for alignment and operative coupling to the electrical membrane guide magnetic gasket 441 of the replaceable electrical key press detection membrane 440 and for alignment and operative coupling to the inner guide magnetic gasket 422 of the keyboard top case 420. In other example embodiments described with respect to FIGS. 6A and 6C, a replaceable rubber dome layer 630 be formed for actuating keys 621 of the keyboard top case 620, including a rubber dome guide magnetic gasket 631 for alignment and operative coupling of the replaceable rubber dome layer 630 to the replaceable electrical key detection membrane 640 and for alignment and operative coupling to the keyboard top case 620.

At block 710, a replaceable electrical key press detection membrane may be formed with an electrical membrane guide magnetic gasket for alignment and operative coupling to the replaceable rubber dome layer. The electrical membrane guide magnetic gasket in an embodiment may include a notched gasket portion for alignment with the keyboard controller PCB housed within the keyboard bottom case. For example, in an embodiment described with reference to FIG. 4, a replaceable electrical key press detection membrane 440 may be formed with an electrical membrane guide magnetic gasket 441 for alignment and operative coupling to the replaceable rubber dome layer 430. The electrical membrane guide magnetic gasket 441 in an embodiment may include a notched gasket portion 441*a* for alignment with the keyboard controller PCB housed within the keyboard bottom case 450. In other example embodiments described with respect to FIGS. 6A and 6C, a replaceable electrical key press detection membrane 640 may be housed within the keyboard bottom case 650 and formed with an electrical membrane guide magnetic gasket 641 for alignment and operative coupling to the replaceable rubber dome layer 630.

In such a way, the sustainable and user-repairable keyboard structure in embodiments of the present disclosure may provide an easy way for user to access and repair each of these various internal keyboard assembly components, rather than disposing of the entire keyboard assembly, thus deterring unnecessary waste. The method for forming a plurality of stackable user-replaceable internal components of a repairable keyboard structure may then end.

Figure 8:
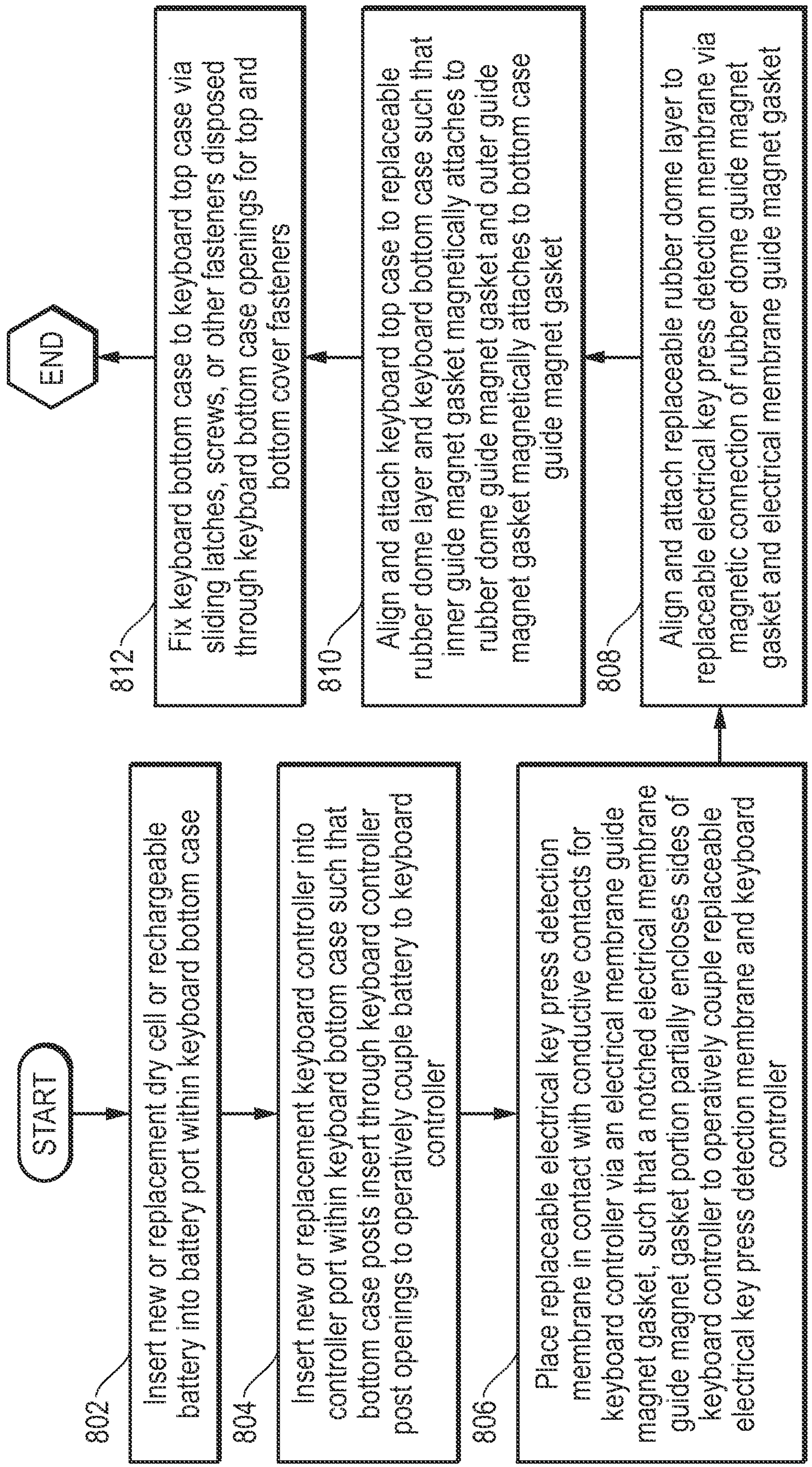
FIG. 8 is a flow diagram illustrating a method of assembling a repairable keyboard structure according to an embodiment of the present disclosure.

FIG. 8 is a flow diagram illustrating a method of assembling a repairable keyboard structure comprising a plurality of stackable user-replaceable internal components according to an embodiment of the present disclosure. As described herein, the sustainable and user-repairable keyboard structure in an embodiment may allow the user to easily separate top and bottom cases of a keyboard assembly, and to detach the various layers from one another by separating magnetic gaskets to expose one or more damaged components in need of replacement. Upon such a separation, the user may replace damaged components such as a dry cell battery, a rechargeable battery, a keyboard controller or port connector, an electrical key press detection membrane, a rubber dome layer, or any one of the keys, on an individual basis. Following such replacement, the user may easily reassemble each of the layers by magnetically coupling the gaskets for each layer to the gasket for another layer, then reattaching the top and bottom cases through replacement of the fasteners.

At block 802, a new or replacement dry cell or rechargeable battery may be inserted into the battery port of the keyboard bottom case that will be used to power the keyboard and keyboard controller PCB. For example, in an embodiment described with reference to FIG. 2, a new or replacement dry cell or rechargeable battery 253 may be inserted into the battery port of the keyboard bottom case 250 in an embodiment. In another example embodiment described with respect to FIG. 6A, a new or replacement dry cell or rechargeable battery 653 may be inserted into the battery port of the keyboard bottom case 650 in an embodiment.

A new or replacement keyboard controller PCB in an embodiment at block 804 may be inserted with a port connector and components in the keyboard bottom case such that the bottom case posts insert through the keyboard controller PCB post openings and keyboard controller PCB hooks or fasteners operatively couple the keyboard controller PCB in the keyboard bottom case. In an embodiment described with reference to FIG. 1, the battery port housed within the user-repairable keyboard structure 190 for insertion of the replaceable keyboard battery 153 may be operatively coupled (e.g., via a conductive wire or electrical lead) to the keyboard controller PCB and a port connector also housed within the keyboard bottom case. The operative coupling between the replaceable keyboard battery 153 and the keyboard controller PCB is for powering the replaceable keyboard controller 151 and PCB. In another example embodiment described with respect to FIG. 2, a new or replacement keyboard controller PCB 251 may be inserted along with the port connector in the keyboard bottom case 250, and be operatively coupled to the replaceable keyboard battery 253 to provide power to the replaceable keyboard controller PCB 251. In still another example embodiment described with respect to FIG. 3, a new or replacement keyboard controller PCB 351 may be inserted with a port connector in the keyboard bottom case 350 such that the bottom case posts insert through the keyboard controller PCB post openings and keyboard controller PCB hooks 359 or other fasteners operatively couple the keyboard controller PCB 351 to the keyboard bottom case 350.

At block 806, the replaceable electrical key press detection membrane may be placed in contact with conductive contacts for the keyboard controller such that the notched gasket portion of the electrical membrane guide magnetic gasket partially encloses one or more sides of the keyboard controller PCB to operatively couple the replaceable electrical key press detection membrane and the keyboard controller PCB. For example, in an embodiment described with reference to FIG. 1, the replaceable keyboard controller 151 may be formed on a PCB with conductive contacts for operative coupling to the replaceable electrical key press detection membrane 140, a portion of which may be placed into physical contact with the conductive contacts during the assembly process for the user-repairable keyboard structure 190. In another example embodiment described with reference to FIG. 2, a new or replacement replaceable electrical key press detection membrane 240 may be placed in at least partial contact with conductive contacts for the replaceable keyboard controller PCB 251 to operatively couple the replaceable electrical key press detection membrane 240 and the replaceable keyboard controller PCB 251. In still another example embodiment described with respect to FIG. 3, the replaceable electrical key press detection membrane may be placed in contact with conductive contacts 356 for the replaceable keyboard controller PCB 351 to operatively couple the replaceable electrical key press detection membrane and the replaceable keyboard controller PCB 351. In yet another example described with respect to FIG. 4, the replaceable electrical key press detection membrane 440 may be disposed within the keyboard bottom case 450, such that the notched gasket portion 441*a* of the electrical membrane guide magnetic gasket 441 aligns with at least two sides of the replaceable keyboard controller PCB housed within the keyboard bottom case 450, such as below and beside an interior side of the replaceable keyboard controller PCB, when installed.

The replaceable rubber dome layer in an embodiment at block 808 may be aligned with and operatively coupled to the replaceable electrical key press detection membrane via magnetic coupling of the rubber dome guide magnetic gasket and the electrical membrane guide magnetic gasket. For example, in an embodiment described with reference to FIG. 2, a new or replacement replaceable rubber dome layer 230 may be aligned with and operatively coupled to the replaceable electrical key press detection membrane 240 via magnetic coupling of the rubber dome guide magnetic gasket 231 and an electrical membrane guide magnetic gasket. In another example embodiment described with reference to FIG. 4, the replaceable rubber dome layer 430 may be situated between the replaceable electrical key press detection membrane 440 and the keyboard top case 420. In an embodiment, the replaceable rubber dome layer 430 may be aligned with and operatively coupled to the replaceable electrical key press detection membrane 440 via magnetic coupling of the rubber dome guide magnetic gasket (e.g., 231 in FIG. 2) and the electrical membrane guide magnetic gasket 441. In other embodiments described with respect to FIGS. 6A and 6C, for example, the replaceable rubber dome layer 630 may be aligned with and operatively coupled to the replaceable electrical key press detection membrane 640 via magnetic coupling of a rubber dome guide magnetic gasket 631 and the electrical membrane guide magnetic gasket 641.

At block 810, the keyboard top case may be aligned with and operatively coupled to the replaceable rubber dome layer via magnet connection of the inner guide magnetic gasket of the keyboard top case and the rubber dome guide magnetic gasket. The keyboard top case in an embodiment may also be aligned with and operatively coupled to the keyboard bottom case via magnetic coupling of the keyboard top case outer guide magnetic gasket and the bottom case guide magnetic gasket. For example, in an embodiment described with reference to FIG. 2, the keyboard top case 220 may be aligned with and operatively coupled to the replaceable rubber dome layer 230 via magnetic coupling of the inner guide magnetic gasket of the keyboard top case 220 and the rubber dome guide magnetic gasket 231. The keyboard top case 220 in an embodiment may also be aligned with and operatively coupled to the keyboard bottom case via magnetic coupling of the keyboard top case outer guide magnetic gasket and the bottom case guide magnetic gasket 252.

In an embodiment described with respect to FIG. 6A, for example, the keyboard top case 620 in an embodiment may be aligned with and operatively coupled to the replaceable rubber dome layer 630 via magnet connection of an inner guide magnetic gasket of the keyboard top case 620 and a rubber dome guide magnetic gasket of the replaceable rubber dome layer 630. The keyboard top case 620 in an embodiment may also be aligned with and operatively coupled to the keyboard bottom case 650 via magnetic coupling of a keyboard top case outer guide magnetic gasket and a bottom case guide magnetic gasket. In an embodiment described with respect to FIG. 6C, the keyboard top case 620 in an embodiment may be aligned with and operatively coupled to the replaceable rubber dome layer 630 via magnetic coupling of the inner guide magnetic gasket 622 of the keyboard top case 620 and the rubber dome guide magnetic gasket 631.

The keyboard bottom case in an embodiment at block 812 may be further fixed to the keyboard top case via top and keyboard bottom case fasteners. For example, in an embodiment described with respect to FIG. 4, the keyboard bottom case 450 may be further fixed to the keyboard top case 420 via top and keyboard bottom case fasteners. Such fasteners may include sliding latches, screws, or other fasteners disposed within the openings 455*a* and 455*b*. In yet another example embodiment described with respect to FIG. 5, the keyboard bottom case 550 may be fixed to the keyboard top case via top and keyboard bottom case fasteners such as sliding latches 557.

In such a way, the sustainable and user-repairable keyboard structure in embodiments of the present disclosure may provide an easy way for user to access and repair each of these various internal keyboard assembly components, with limited or no tools, rather than disposing of the entire keyboard assembly, thus deterring unnecessary waste. The method for assembling a repairable keyboard structure comprising a plurality of stackable user-replaceable internal components may then end.

The blocks of the flow diagram of FIGS. 7 and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A sustainable and user-repairable keyboard structure for an information handling system comprising:

a plurality of keyboard component layers for detecting a downward force on one of a plurality of replaceable keys by a user and registering the downward force as a keystroke;

each of the plurality of keyboard component layers housing one or more of a plurality of guide magnetic gaskets for aligning and magnetically coupling to another of the plurality of keyboard component layers;

each of the plurality of keyboard component layers being separable from one another by a user exerting force to overcome a magnetic coupling between two or more of the plurality of guide magnetic gaskets;

the plurality of keyboard component layers including a keyboard bottom case housing a replaceable battery disposed beneath a replaceable electrical key press detection membrane, the replaceable electrical key press detection membrane disposed beneath a replaceable rubber dome layer, and the rubber dome layer disposed beneath a keyboard top case housing the plurality of replaceable keys; and the keyboard bottom case fixed to the keyboard top case via a plurality of user-removable fasteners.

2. The sustainable and user-repairable keyboard structure of claim 1 further comprising:

the keyboard bottom case housing a bottom case guide magnetic gasket for aligning magnetic coupling between the keyboard bottom case and the keyboard top case.

3. The sustainable and user-repairable keyboard structure 1 further comprising:

the keyboard top case housing an outer guide magnetic gasket for aligning magnetic coupling between the keyboard top case and the keyboard bottom case.

4. The sustainable and user-repairable keyboard structure 1 further comprising:

the keyboard top case housing an inner guide magnetic gasket for aligning magnet coupling between the keyboard top case and the replaceable rubber dome layer.

5. The sustainable and user-repairable keyboard structure of claim 1 further comprising:

the replaceable rubber dome layer housing a rubber dome guide magnetic gasket for aligning magnetic coupling between the replaceable rubber dome layer and the replaceable electrical key press detection membrane.

6. The sustainable and user-repairable keyboard structure of claim 1 further comprising:

the replaceable electrical key press detection membrane housing an electrical membrane guide magnetic gasket for aligning magnetic coupling between the replaceable rubber dome layer and the replaceable electrical key press detection membrane.

7. The sustainable and user-repairable keyboard structure of claim 1 further comprising:

the keyboard bottom case having a keyboard controller PCB post and keyboard controller PCB fastener for operatively coupling a replaceable keyboard controller printed circuit board (PCB) therewithin; and the replaceable keyboard controller PCB having a port connector that is operatively coupled to a replaceable keyboard battery, for charging the replaceable keyboard battery via the port connector.

8. A method of assembly for a user-repairable keyboard structure for an information handling system comprising:

placing a replaceable electrical key press detection membrane within a keyboard bottom case and in contact with conductive contacts for a replaceable keyboard controller printed circuit board (PCB) housed within the keyboard bottom case;

placing a replaceable rubber dome layer atop the replaceable electrical key press detection membrane such that a rubber dome guide magnetic gasket fixed to the replaceable rubber dome layer aligns with and magnetically couples to an electrical membrane guide magnetic gasket fixed to the replaceable electrical key press detection membrane;

placing a keyboard top case atop the replaceable rubber dome layer such that an inner guide magnetic gasket fixed to the keyboard top case aligns with and magnetically couples to the rubber dome guide magnetic gasket and such that an outer guide magnetic gasket fixed to the keyboard top case aligns with and magnetically couples to a bottom case guide magnetic gasket fixed to the keyboard bottom case; and securing the keyboard bottom case to the keyboard top case via a plurality of latches formed in the keyboard bottom case.

9. The method of assembly of claim 8 further comprising:

inserting a replaceable and rechargeable keyboard battery within a battery port housed within the keyboard bottom case and operatively coupling the replaceable and rechargeable keyboard battery to the replaceable keyboard controller PCB housed in the keyboard bottom cover to supply power to the replaceable keyboard controller PCB.

10. The method of assembly of claim 8 further comprising:

inserting a replaceable dry cell keyboard battery within a battery port housed within the keyboard bottom case to operatively couple the replaceable dry cell keyboard battery to the replaceable keyboard controller PCB housed in the keyboard bottom case to supply power to the replaceable keyboard controller PCB.

11. The method of assembly of claim 8 further comprising:

operatively coupling the replaceable keyboard controller PCB with the keyboard bottom via a keyboard controller PCB post and a keyboard controller PCB hook formed in the keyboard bottom case.

12. The method of assembly of claim 8 further comprising:

inserting the replaceable electrical key press detection membrane within the keyboard bottom case such that a notched gasket portion of the electrical membrane guide magnetic gasket aligns with at least two sides of the replaceable keyboard controller printed circuit board (PCB) and the replaceable electrical key press detection membrane is aligned to contact the conductive contacts of the replaceable keyboard controller PCB.

13. The method of assembly of claim 8 further comprising:

placing the replaceable electrical key press detection membrane within the keyboard bottom case, below and inside an outer perimeter of the bottom case magnetic gasket.

14. The method of assembly of claim 8 further comprising:

mechanically attaching a replaceable keyboard key to the keyboard top case via a plurality of snaps for causing a portion of the replaceable rubber dome layer to operatively couple with the replaceable electrical key press detection membrane and to cause the replaceable keyboard controller to register a keystroke when the replaceable keyboard key is actuated.

15. A sustainable and user-repairable keyboard structure for an information handling system comprising:

a plurality of keyboard component layers for detecting a downward force on one of a plurality of replaceable keys of a keyboard by a user and registering the downward force as a keystroke via a keyboard controller on a replaceable keyboard controller printed circuit board (PCB) in the keyboard;

a keyboard bottom case housing a replaceable battery disposed beneath a replaceable electrical key press detection membrane and having a bottom case guide magnetic gasket that aligns and magnetically couples to an outer guide magnetic gasket of a keyboard top case, wherein the keyboard bottom case is separable from the keyboard top case by a user exerting a first force to overcome a first magnetic coupling between the bottom case guide magnetic gasket and the outer guide magnetic gasket of the keyboard top case;

the replaceable electrical key press detection membrane disposed beneath a replaceable rubber dome layer having an electrical membrane guide magnetic gasket that aligns and magnetically couples to a rubber dome guide magnetic gasket of the replaceable rubber dome layer, wherein the replaceable electrical key press detection membrane is separable from the replaceable rubber dome layer by a user exerting a second force to overcome a second magnetic coupling between the electrical membrane guide magnetic gasket and the rubber dome guide magnetic gasket of the replaceable rubber dome layer;

the rubber dome layer disposed beneath the keyboard top case housing the plurality of replaceable keys, wherein the rubber dome guide magnetic gasket aligns and magnetically couples to an inner guide magnetic gasket of the keyboard top case, wherein the rubber dome layer is separable from the keyboard top case by a user exerting a third force to overcome a third magnetic coupling between the rubber dome guide magnetic gasket and the inner guide magnetic gasket; and the keyboard bottom case operatively coupled to the keyboard top case via a plurality of mechanical fasteners.

16. The sustainable and user-repairable keyboard structure of claim 15, wherein the replaceable keyboard battery is a dry cell battery.

17. The sustainable and user-repairable keyboard structure of claim 15 further comprising:

the keyboard bottom case having a keyboard controller PCB post, keyboard controller PCB fastener, and a controller port for insertion of a replaceable keyboard controller PCB therewithin that is operatively coupled to a port connector hardware for insertion of port connector hardware in the controller port.

18. The sustainable and user-repairable keyboard structure of claim 15 further comprising:

the replaceable electrical key press detection membrane including a notched gasket portion for guiding operative coupling between the replaceable keyboard controller PCB and a conductive portion of the replaceable electrical key press detection membrane via a conductive contact disposed on the surface of the replaceable keyboard controller PCB.

19. The sustainable and user-repairable keyboard structure of claim 15, wherein the plurality of mechanical fasteners are sliding latches disposed within the keyboard bottom case.

20. The sustainable and user-repairable keyboard structure of claim 15, wherein the plurality of mechanical fasteners are screws disposed through the bottom keyboard case.

* * * * *